United States Patent
Chung (10) Patent No.: US 10,647,515 B2
(45) Date of Patent: May 12, 2020

(54) SEAL SYSTEM AND METHOD FOR BOLTED TRACK USED IN CONVEYORIZED BAKING OVENS

(71) Applicant: BAKING TECHNOLOGY SYSTEMS, INC., Tucker, GA (US)

(72) Inventor: Chi Chung, Smyrna, GA (US)

(73) Assignee: BAKING TECHNOLOGY SYSTEMS, INC., Tucker, GA (US)

( * ) Notice: Subject to any disclaimer, the term of this patent is extended or adjusted under 35 U.S.C. 154(b) by 201 days.

(21) Appl. No.: 15/592,782

(22) Filed: May 11, 2017

(65) Prior Publication Data

US 2017/0327318 A1  Nov. 16, 2017

Related U.S. Application Data

(60) Provisional application No. 62/335,238, filed on May 12, 2016.

(51) Int. Cl.
| | |
|---|---|
| *B65G 21/22* | (2006.01) |
| *F16J 15/06* | (2006.01) |
| *F16J 15/10* | (2006.01) |
| *A21B 3/00* | (2006.01) |
| *A21B 1/46* | (2006.01) |

(52) U.S. Cl.
CPC ............ *B65G 21/22* (2013.01); *F16J 15/062* (2013.01); *A21B 1/46* (2013.01); *A21B 3/00* (2013.01); *F16J 15/10* (2013.01)

(58) Field of Classification Search
CPC ........ B65G 41/00; B65G 41/06; B65G 41/30; B65G 2207/30; B65G 21/06; F16J 15/028
USPC ....................................................... 198/860.2
See application file for complete search history.

(56) References Cited

U.S. PATENT DOCUMENTS

| | | | | |
|---|---|---|---|---|
| 2,854,129 A | | 9/1958 | Long | |
| 4,013,167 A | * | 3/1977 | Bourgeois | B65G 21/02 198/835 |
| 4,172,677 A | * | 10/1979 | Gunti | B65G 13/11 198/860.2 |
| 4,186,832 A | * | 2/1980 | Kelley | B65G 19/30 198/657 |

(Continued)

FOREIGN PATENT DOCUMENTS

GB  356101 A  9/1931

OTHER PUBLICATIONS

International Search Report & Written Opinion for PCT/U2017/032158; dated Aug. 9, 2017; 14 pgs.

*Primary Examiner* — Nicholas L Foster
*Assistant Examiner* — L. Susmitha Koneru
(74) *Attorney, Agent, or Firm* — Gardner Groff & Greenwald, PC (57) ABSTRACT

A seal system and method for a bolted track such as a baking system conveyor track. The seal system provides a seal between a pair of track pieces being coupled end-to-end to one another. The seal system includes flanges attached near the ends of the track pieces and a gasket compressed between the flanges when the track pieces are coupled to form a seal. In example embodiments, the gasket is attached to a track plate. The track plate is coupled between the flanges and is configured to shield the gasket from heat and direct flame. The seal system optionally also includes a joint cover affixed to the bottom of the coupled flanges to form a secondary seal.

19 Claims, 6 Drawing Sheets

(56) References Cited

U.S. PATENT DOCUMENTS

| | | | | |
|---|---|---|---|---|
| 4,399,908 | A * | 8/1983 | Gunti | B65G 21/06 |
| | | | | 198/789 |
| 4,681,329 | A * | 7/1987 | Contin | F16J 15/0881 |
| | | | | 277/643 |
| 6,612,426 | B1 * | 9/2003 | Guerra | B65G 21/06 |
| | | | | 198/841 |
| 7,871,015 | B2 * | 1/2011 | Akhtar | E01B 11/54 |
| | | | | 238/159 |
| 2005/0098646 | A1 * | 5/2005 | Urmson, Jr. | E01B 11/04 |
| | | | | 238/151 |

* cited by examiner

SEAL SYSTEM AND METHOD FOR BOLTED TRACK USED IN CONVEYORIZED BAKING OVENS

CROSS-REFERENCE TO RELATED APPLICATION

This application claims the benefit of U.S. Provisional Patent Application Ser. No. 62/335,238 filed May 12, 2016, the entirety of which is hereby incorporated herein by reference for all purposes.

TECHNICAL FIELD

The present invention relates generally to the field of commercial baking equipment, and more particularly to a seal system and method for a bolted track used in conveyorized backing ovens.

BACKGROUND

Commercial baking systems often use a continuous conveyor track to move products through the different baking apparatuses such as proofers and ovens in a baking system. The continuous conveyor track can be constructed from a modular track system. The track is commonly constructed from a series of track pieces coupled end to end to form the desired track shape. The track pieces are typically directly coupled together, usually by welding each track piece together, end-to-end. However, this process can be time consuming and suffer from issues with quality. Further, welding the track pieces together may make it hard to change or replace track pieces after the initial construction. As a result, a bolted track system has been developed wherein the track pieces are bolted to one another, instead of welded, end-to-end.

In the bolted track system, a flange is typically attached to each end of the individual track pieces. The flanges of each track piece can be bolted or fastened to one another using a variety of attachment methods. Often, the flanges of each track piece are attached to a track support beam designed to support the track above a support surface. Caulk may be applied between the flanges and the track support to create a seal. While the bolted track system may be considered an improvement over the direct attachment track system, it can still suffer from issues including leaks. These leaks are especially problematic in the baking application as it can create a food safety hazard.

The leaks generally result from one of two main issues. First, the flanges on the track pieces are not always attached at the correct dimensions. When the flanges are attached too close to the ends of the track it creates a gap between the two track pieces, which can allow oil or other lubricant to leak through. When the flanges are attached too far from the ends of the track it creates a gap between the flanges or between the flange and the track support which can prevent a proper seal. The second issue stems from the application of the caulk to create a seal. When applied, the caulk often needs time to cure in order to create a seal. Movement of the joint after application of the caulk can hinder the curing process. It is not uncommon for a track piece to be moved or adjusted during the construction of a modular track. This movement often prevents the caulk from forming a proper seal.

Accordingly, it can be seen that needs exist for an improved sealing system and method for a bolted track that will result in a more uniform and consistent seal.

It is to the provision of a sealing system and method for a bolted track meeting these and other needs that the present invention is primarily directed.

SUMMARY

In example embodiments, the present invention provides a seal system and sealing method for a bolted track such as a baking system conveyor track. The seal system is configured to create a seal between a pair of track pieces being coupled end-to-end. The seal system generally includes flanges attached near the ends of the track pieces and a gasket compressed between the flanges when the track pieces are coupled to form a seal. In example embodiments, the gasket is attached to a track plate. The track plate is coupled between the flanges and is configured to shield the gasket from heat and direct flame. The seal system can also include a joint cover affixed to the bottom of the coupled flanges to form a secondary seal.

In one aspect, the present invention relates to a seal system for coupling two track pieces in a conveyor system. The seal system includes a flange attached adjacent to an end of each of the track piece and a gasket compressed between the flanges.

In another aspect, the invention relates to a seal system for coupling two track pieces in a modular conveyor system. The seal system includes a track plate including a gasket and a flange attached adjacent to an end of each of the track pieces. The track plate is held in between the two flanges.

In still another aspect, the invention relates to a method of sealing a joint between two track pieces. The method includes attaching a flange adjacent to an end of each of the track pieces. The flange is attached a distance from the end of each track pieces. The method also includes positioning a track plate between the flanges of each track piece. The track plate includes a cut-out dimensioned to accommodate the ends of the track pieces. The gasket is configured to sit within the cut-out. The method also includes coupling the flanges to one another with the track plate in between the flanges. The gasket is positioned such that the flanges compress the gasket to form a seal.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-8 show a seal system 10 for a bolted track such as a conveyor track for moving items through an oven, a proofer, and/or other components of a commercial baking system. The seal system 10 generally includes a gasket 20 configured to fit between the flanges 40 of the track pieces T. The gasket 20 is configured to form a seal at the seam between the ends of adjacent track pieces T. The track pieces T can contain oil or other lubricant to facilitate movement along the conveyor track. The gasket seam 20 is configured to help prevent the oil or lubricant from leaking through the seam between adjacent track pieces T. This function is particularly important in conveyor systems, like commercial baking systems, where oil can contaminate the product.

Figure 1:
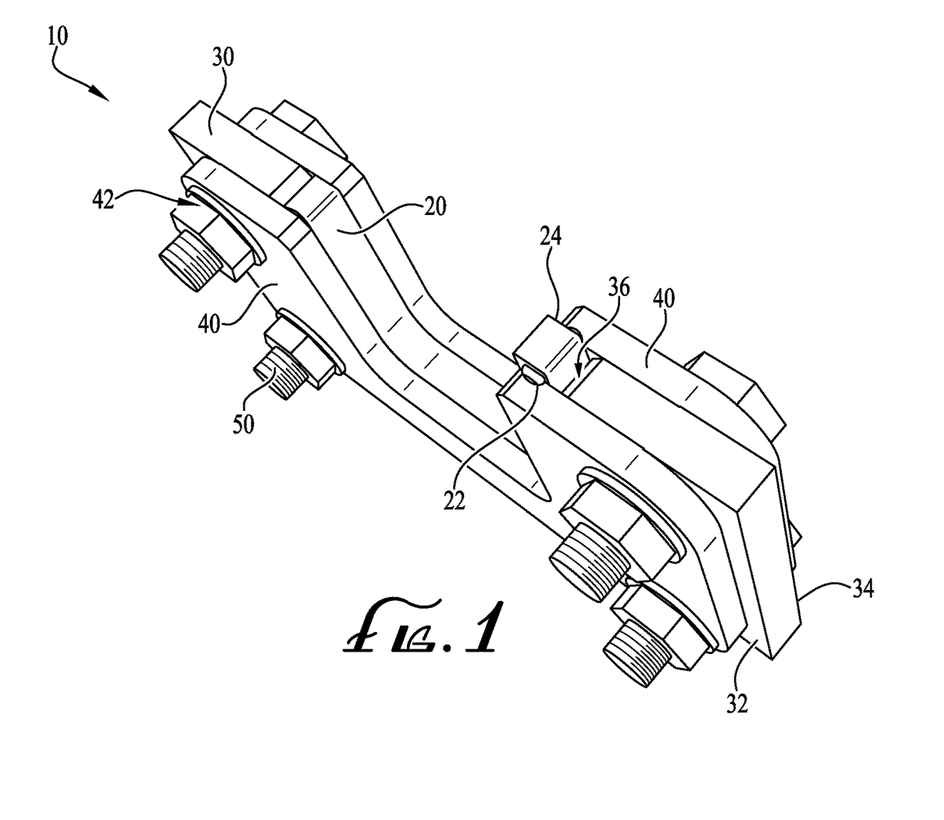
FIG. 1 is a perspective view of a seal system for a bolted track according to an example embodiment of the present invention.
Figure 2:
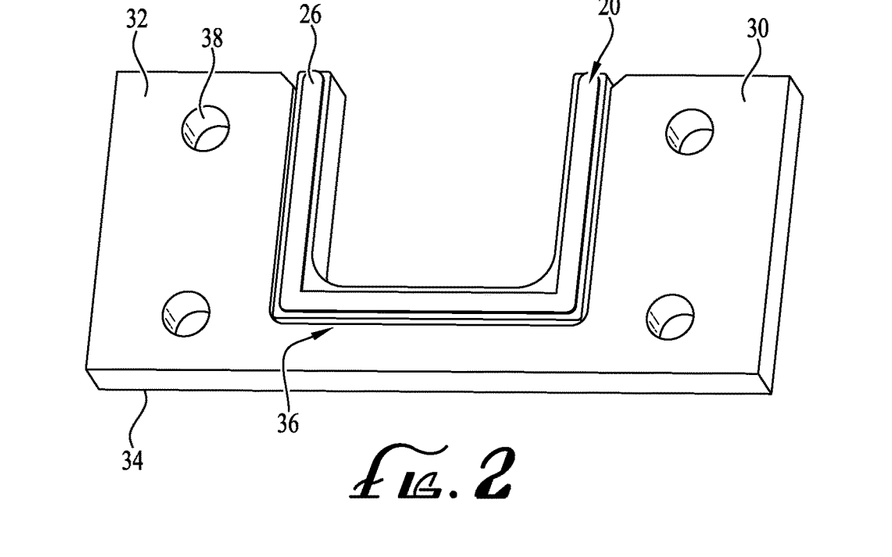
FIG. 2 is a perspective view of the track plate and gasket of the seal system of FIG. 1.
Figure 3:
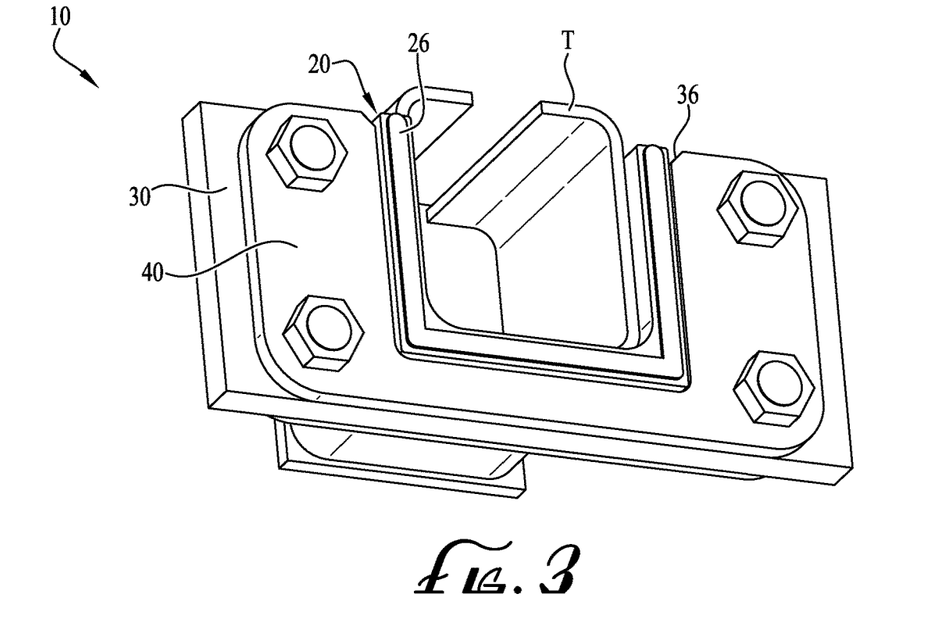
FIG. 3 is a perspective view of the seal system of FIG. 1 interacting with a track piece.

FIGS. 1-3 show a seal system 10 for a bolted track according to an example embodiment of the invention. The seal system includes a gasket 20 and a track support or track plate 30, as shown in FIG. 2. The track support 30 is formed from a plate with a first side 32, a second side 34, and a thickness defined between the first and second side. The track support 30 includes a cut-out 36 extending through the first side 32 and the second side 34. The cut-out generally creates an opening at the top of the track plate 30. The cut-out 36 is configured to receive the track pieces T, as shown in FIG. 3. In the depicted embodiment, the cut-out 36 has a rectangular cross section in order to couple with a track piece T with a similarly shaped cross section. In other embodiments, the cut-out 36 can have any shaped cross section that accommodates the desired track pieces T. The track support 30 can also include holes 38 for bolting the track support to the flanges 40 of the track piece T. The track support 30 can be formed from a composite, polymer, metal including aluminum or stainless steel, or other material(s).

The gasket 20 is configured to fit around and sit inside the cutout 32 in the track support 30. The gasket 20 can have a thickness generally equal to the thickness of the track support 30. In the depicted embodiment, the gasket 20 has a first end 22 and a second end 24 with a generally U-shaped cross section. The first and second ends 22, 24 of the gasket 20 can include a raised ridge 26 that protrudes from the ends of the gasket. In the depicted embodiment, the raised ridge 26 extends around both legs and the cross member of the U-shaped ends 22, 24 of the gasket. In alternate embodiments, the raised ridge 26 may only be on a portion of the legs and/or cross member of the U-shaped ends. The gasket can be formed from a high-temperature resistant silicon, gortex, graphite, or other deformable, resilient material.

The track support 30 and gasket 20 are fitted between the flanges 40 of two track pieces T to form a seal. The flange 40 of a first track piece T is positioned to abut the first side 32 of the track support 30. The flange 40 of a second track piece T is positioned to abut the second side 34 of the track support 30. The flanges 40 are generally attached a distance behind the end of the track piece T such that when the flange 40 abuts an end of the track support 30, the end of the track piece extends within the cut-out 36 of the of the track support 30. The distance between each flange 40 and the end of the respective track piece T should allow the ends of the first and second track pieces to meet, or come close to meeting, when the flange of each track piece abuts the track support 30. Therefore, the distance between each flange 40 and the end of the respective track piece T is generally less than the thickness of the track support 30. In example embodiments, the distance between the flange 40 and the end of the track piece T is approximately one half the thickness of the track support 30. As shown in FIG. 3, the end of the track piece T can abut the gasket 20. In example embodiments, the gasket 20 covers at least a portion of the seam between the two track pieces T. The flanges 40 generally include holes 42 configured to align with the holes 38 on the track support 30. The holes 38, 42 allow the flanges 40 and track support 30 to be bolted together using conventional bolts 50 or another fastening means. When the flanges 40 are bolted to the track support 30 the flanges compress the raised ridges 26 on each end of the gasket 20 to create a seal. The gasket 20 is configured to sit inside the track support 30 to help prevent damage to the gasket caused by its proximity to heat and flame within a baking system through which the track traverses. The gasket 20 is also configured to be able to be unbolted and rebolted multiple times without damaging the gasket. In other words, unbolting and rebolting two track pieces generally does not prevent the gasket 20 from being able to reform a seal when rebolted.

Figure 4:
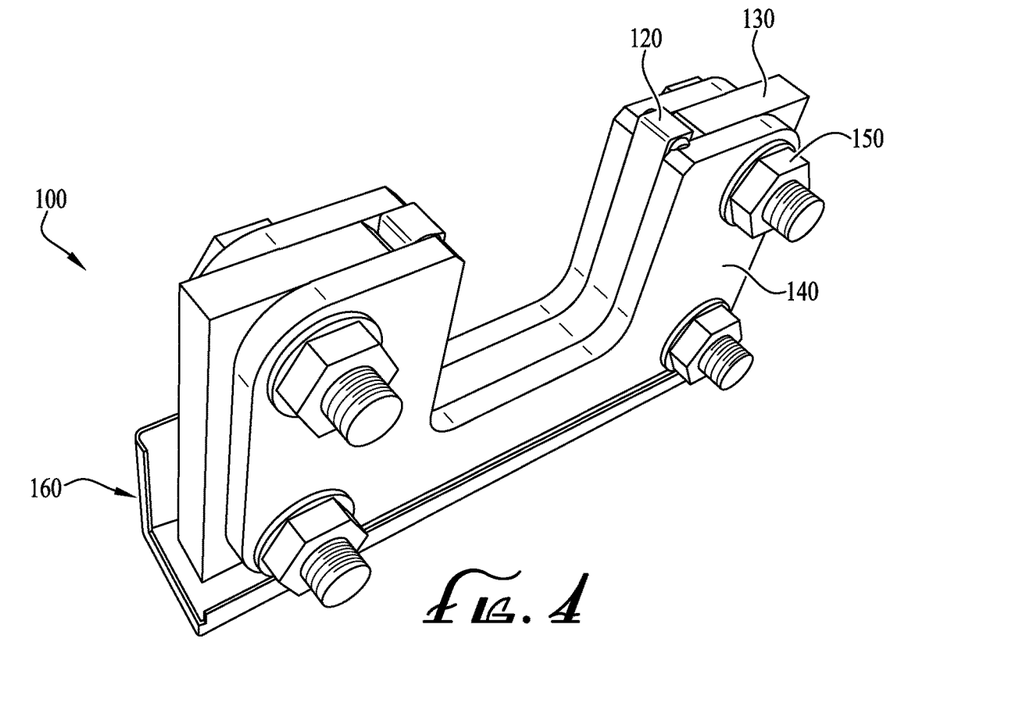
FIG. 4 is a perspective view of a seal system for a bolted track according to another example embodiment of the present invention.
Figure 5A:
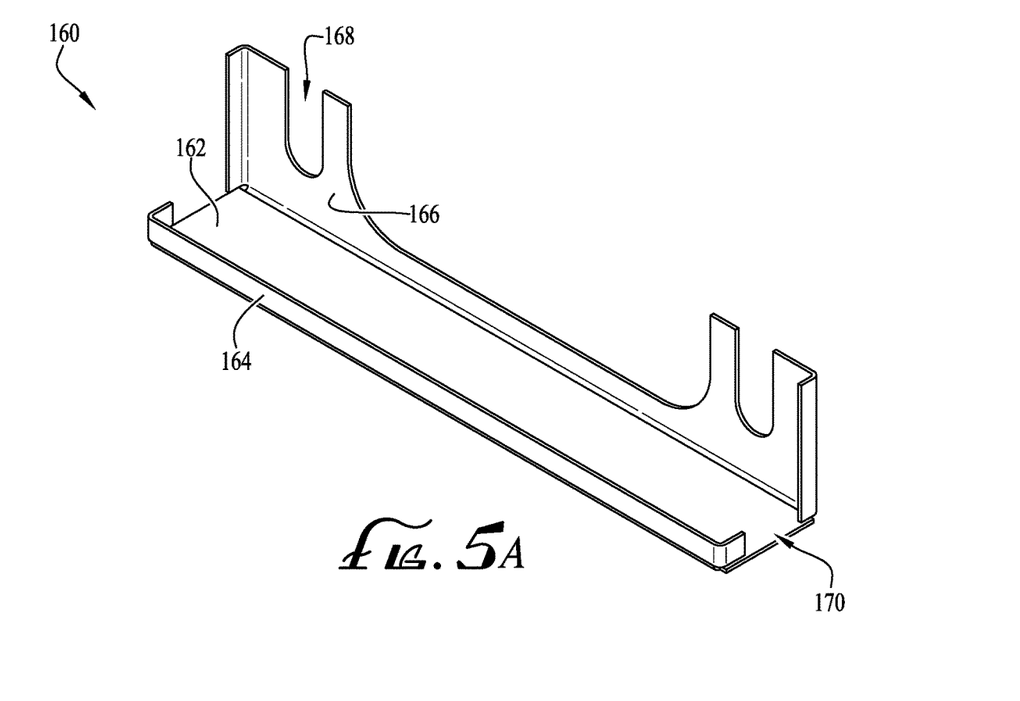
FIG. 5A is a perspective view of the joint cover of the seal system of FIG. 4.
Figure 5B:
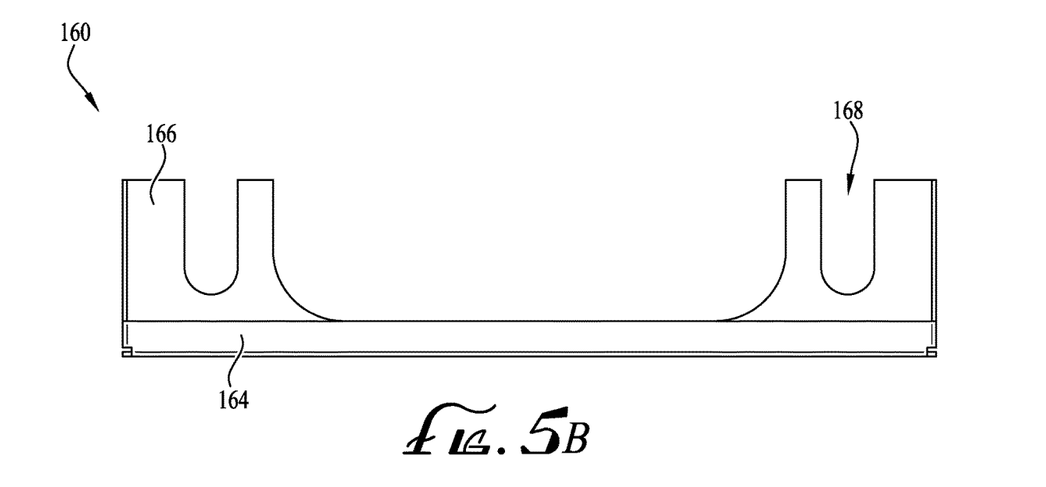
FIG. 5B is a front view of the joint cover of the seal system of FIG. 4.
Figure 5C:
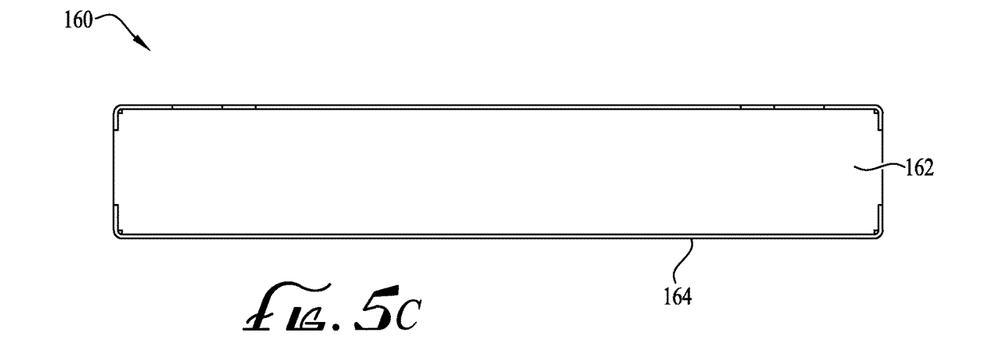
FIG. 5C is a top view of the joint cover of the seal system of FIG. 4.
Figures 5D, 6:
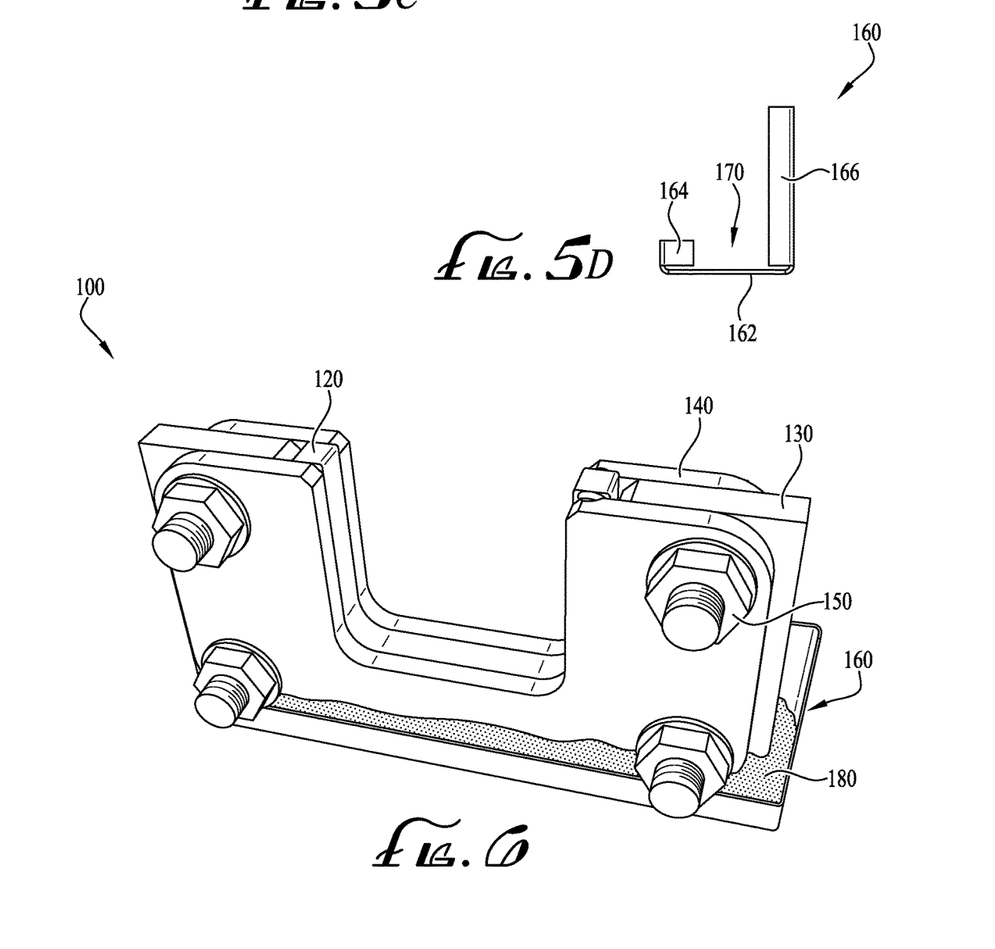
FIG. 5D is a side view of the joint cover of the seal system of FIG. 4.
FIG. 6 is a perspective view of the seal system of FIG. 4 with an adhesive material.

FIGS. 4-6 show an alternate embodiment of the seal system 100. In this embodiment, in addition to the track support 130 and gasket 120, the system 100 optionally also includes a joint cover 160. The joint cover 160 is configured to form an additional seal to support the seal created by the gasket 120 and provide additional protection of the gasket 120 from heat and direct flame present in the baking process. The joint cover 160 includes a bottom plate 162 and side walls 164 extending upward from the periphery of the bottom plate. The bottom plate 162 is configured to have a similar cross section to the cross section created when the flanges 140 and track support 130 are bolted together. The joint cover 160 is configured to fit over the bottom of the bolted together flanges 140 and track support 130, as shown in FIG. 4. The joint cover 160 can be filled with caulk or other adhesive material 180, for example high temperature silicone caulk. The caulk 180 helps to form a secondary seal and the joint cover 160 holds the caulk in place while it cures or dries. The joint cover 160 can be formed from stainless steel or another metal material.

In example embodiments, the joint cover 160 includes a coupling wall 166 configured to engage with the bolts 150 or other coupling apparatus that couples the flanges 140 to the track support 130. FIG. 5 shows a joint cover 160 with a coupling wall 166 including two slots 168 configured to fit around the bolts 150 that are extending beyond the flange 140 of one of the track pieces. The bolts 150 are then tightened over the portion of the coupling wall 166 adjacent to the slots 168 in order to hold the joint cover 160 coupled to the bottom of the flanges 140 and track support 130. In alternate embodiments, the coupling wall 168 can include holes or other features to couple the joint cover 160 to the flange 140. The joint cover 160 can also include openings 170 in the sidewalls 164 at the ends of the bottom plate 162. The openings 170 are configured to accommodate a track support 130 that extends beyond the bottom plate 162 of the joint cover 160.

Figure 7:
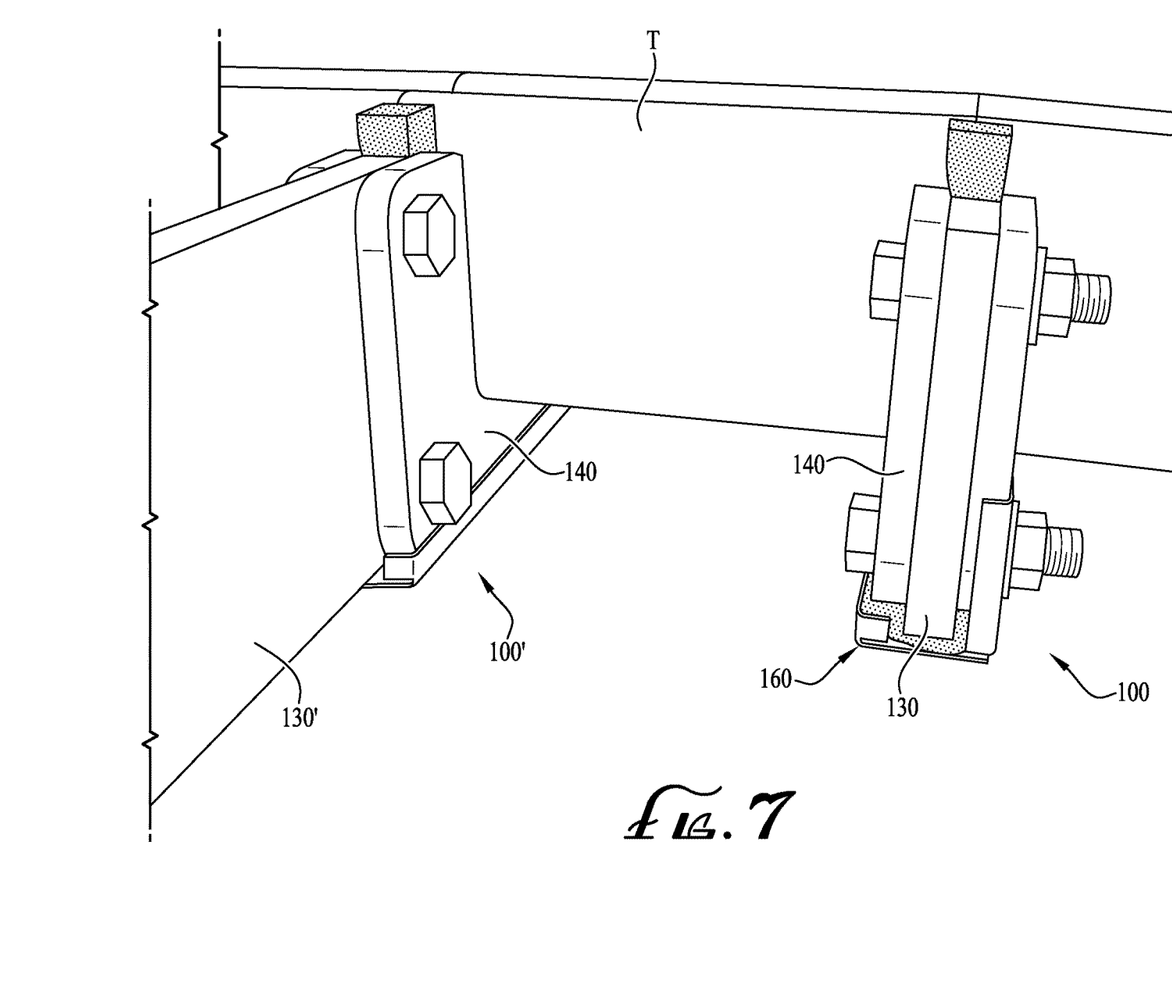
FIG. 7 is a perspective view of a seal system for a bolted track according to example embodiments of the invention.
Figure 8:
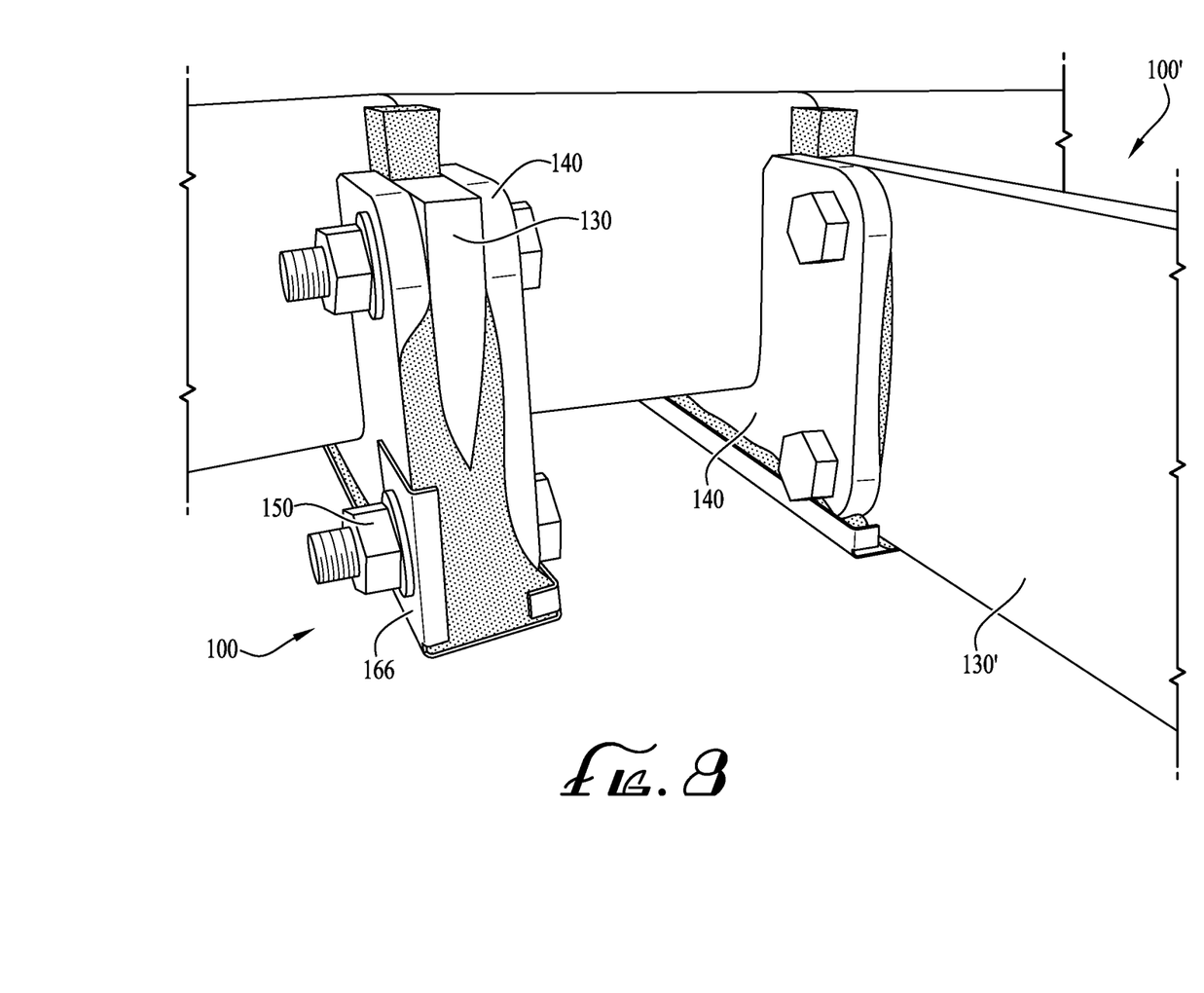
FIG. 8 is an alternate view of the seal systems for a bolted track of FIG. 7.

In example embodiments, the seal system 100 includes a track support 130 that is only attached to the track pieces T being bolted together, as shown in FIGS. 7 and 8. In the depicted embodiments, the track support 130 of the seal system 100 is generally the same dimension as the flanges 140 of the track pieces T being coupled. In other embodiments, the seal system 100' includes a track support 130' configured to help support the track pieces T above a support surface. In this embodiment, the track support 130' is formed from a beam that extends beyond the flanges 140 of the track pieces T bolted together to intersect or couple with another part of the conveyor system. In this embodiment a single track support 130' can include a plurality of cut-outs and gaskets to couple a plurality of pairs of track pieces along the length of the track support.

The invention also includes a method of coupling track pieces, for example pieces of a conveyor track within a commercial baking system, to form a reusable seal. The method generally includes attaching flanges 140 to the abutting or adjacent ends of the track pieces T to be coupled, making a cut-out 136 in a track support 130 with a similar cross section to that of the track piece and fitting a gasket around the periphery of the cutout such that the gasket sits within the cutout. In example embodiments of the method, the gasket can include a raised ridge 126. The method further includes bolting the track support 130 between the flanges 140 of the track pieces T to be coupled. The flanges 140 can be positioned to compress the gasket 120 in between the flanges to form a seal. In alternate embodiments, the method further includes fitting a joint cover 160 over the bottom the bolted together flanges 140. The joint cover 160 can be bolted to at least one of the flanges 140. The method can further include filling the joint cover 160 with caulk to form a secondary seal. This secondary seal assists the gasket seal 120 in preventing oil or lubricant within the track pieces T from leaking through the seam between adjacent track pieces and onto the items conveyed by the track.

While the invention has been described with reference to example embodiments, it will be understood by those skilled in the art that a variety of modifications, additions and deletions are within the scope of the invention, as defined by the following claims. For example, while this invention is described for application in a conveyorized baking oven or baking system, the seal system and method according to the disclosed embodiments can be adapted for use in various other modular conveyor systems for which a seal between adjacent track pieces would be advantageous.

What is claimed is:

1. A seal system for coupling first and second track pieces of a conveyor system, the seal system comprising:
    a first flange attached adjacent to an end of the first track piece and extending transversely therefrom, and a second flange attached adjacent to an end of the second track piece and extending transversely therefrom, the first and second flanges configured for bolting to one another to join the first track piece to the second track piece with a seam between the first and second track pieces; and
    a track support plate having a cutout formed therein, and a sealing gasket positioned within the cutout of the track support plate, whereby the track support plate is configured to be engaged between the first and second flanges with the sealing gasket compressed between the first and second flanges and forming a seal around at least a portion of the seam between the first and second track pieces when the first and second flanges are bolted together with the track support plate engaged therebetween.

2. The seal system of claim 1, wherein the gasket defines a generally U-shaped cross-sectional profile and comprises a raised ridge protruding outwardly from first and second ends of the gasket for sealing engagement with the first and second flanges when the first and second flanges are bolted together.

3. The seal system of claim 1, wherein the first and second flanges each include one or more holes for receiving bolts to connect the first and second flanges together.

4. The seal system of claim 3, wherein the one or more holes in the first flange are configured to align with the one or more holes in the second flange when the first and second flanges are bolted together.

5. The seal system of claim 4, wherein the track support plate also includes one or more holes configured to align with the one or more holes in each of the first and second flanges when the first and second flanges are bolted together.

6. The seal system of claim 1 further comprising a joint cover including a bottom plate and a side wall extending from at least a portion of a periphery of the bottom plate.

7. The seal system of claim 6, wherein the joint cover is coupled to at least one of the first and second flanges such that the bottom plate covers a bottom of each of the flanges.

8. The seal system of claim 7, wherein the joint cover further comprises an adhesive substance between a top of the bottom plate and the bottom of the flanges.

9. A seal system for coupling first and second track pieces in a modular conveyor system, the seal system comprising:
    a track plate having a cutout formed therein, and a gasket positioned within the cutout of the track plate; and
    a first flange extending transversely from an end of the first track piece, and a second flange extending transversely from an end of the second track piece, the first and second flanges each comprising a plurality of bolt holes configured for alignment to receive bolts to link the first and second track pieces to one another with a seam formed between the ends of the first and second track pieces;

wherein the track plate is held between the first and second flanges when the first and second track pieces are linked, and wherein the gasket forms a seal at least partially around the seam between the ends of the first and second track pieces when the bolts are engaged between the first and second flanges.

10. The seal system of claim 9, wherein the gasket defines a generally U-shaped cross-sectional profile and comprises a raised ridge protruding outwardly from first and second ends of the gasket for sealing engagement with the first and second flanges when the bolts are engaged between the first and second flanges.

11. The seal system of claim 9 further comprising a joint cover including a bottom plate and a side wall extending from at least a portion of a periphery of the bottom plate.

12. The seal system of claim 11, wherein the joint cover is coupled to the flanges such that the bottom plate covers a bottom of each of the flanges.

13. The seal system of claim 12, wherein the joint cover further comprises an adhesive substance between a top of the bottom plate and the bottom of the flanges.

14. The seal system of claim 9, wherein the track plate is capable of interacting with a portion of the modular conveyor system.

15. A modular conveyor and seal system comprising:
a first track piece and a second track piece;
a first flange extending from the first track piece, and a second flange extending from the second track piece;
a track support member having a cutout; and
a gasket positioned within the cutout of the track support member;
wherein the first flange and the second flange are configured for coupling the first track piece to the second track piece, with the track support member engaged between the first flange and the second flange and the gasket forming a seal between the first flange and the second flange.

16. The modular conveyor and seal system of claim 15, wherein the gasket defines a generally U-shaped cross-sectional profile and comprises a raised ridge protruding outwardly from first and second ends of the gasket for sealing engagement with the first and second flanges.

17. The modular conveyor and seal system of claim 15, further comprising a joint cover including a bottom plate and a side wall extending from at least a portion of a periphery of the bottom plate.

18. The modular conveyor and seal system of claim 17, wherein the joint cover extends beneath the first and second flanges.

19. The modular conveyor and seal system of claim 17, wherein the joint cover contains a caulk material forming a secondary seal around the first and second track pieces.

* * * * *